US008870262B2

(12) United States Patent
Seitz et al.

(10) Patent No.: US 8,870,262 B2
(45) Date of Patent: Oct. 28, 2014

(54) MOTOR VEHICLE, IN PARTICULAR A PASSENGER CAR

(71) Applicant: GM Global Technology Operations LLC, Detroit, MI (US)

(72) Inventors: Armin Seitz, Buettelborn (DE); Wolfgang Rasel, Rudesheim (DE); Klaus Brandscheid, Geisenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/649,201

(22) Filed: Oct. 11, 2012

(65) Prior Publication Data
US 2013/0088046 A1 Apr. 11, 2013

(30) Foreign Application Priority Data
Oct. 11, 2011 (DE) .......................... 10 2011 115 594

(51) Int. Cl.
*B62D 25/00* (2006.01)
*B60J 5/10* (2006.01)
*B62D 25/10* (2006.01)
(52) U.S. Cl.
CPC *B60J 5/107* (2013.01); *B62D 25/10* (2013.01)
USPC ..................................... 296/146.6; 296/57.1
(58) Field of Classification Search
USPC ................. 296/57.1, 146.8, 146.5, 146.6
See application file for complete search history.

(56) References Cited

U.S. PATENT DOCUMENTS

| 5,536,060 A | 7/1996 | Rashid et al. |
| 7,234,749 B1 * | 6/2007 | Firzlaff et al. ............... 296/57.1 |
| 2011/0179719 A1 | 7/2011 | Matsumoto et al. |

FOREIGN PATENT DOCUMENTS

| DE | 19728546 A1 | 1/1998 |
| DE | 10301794 A1 | 7/2004 |
| GB | 1189810 A | 4/1970 |
| GB | 2061196 A | 5/1981 |
| JP | 06072152 A | 3/1994 |

OTHER PUBLICATIONS

German Patent Office, German Search Report for Application No. 10 2011 115 594.9 dated Jul. 2, 2012.

* cited by examiner

*Primary Examiner* — Joseph D Pape
(74) *Attorney, Agent, or Firm* — Ingrassia Fisher & Lorenz, P.C.

(57) ABSTRACT

In the case of a motor vehicle, in particular a passenger motorcar, with a body in which at least one opening, such as a door opening, a trunk opening or the like is provided, which can be closed off by a pivotably articulated covering element, such as a door, a tail gate, a trunk lid or the like, which has an outer skin and a support structure and at least one function element arranged in between, which is connected to the outer skin, the function element is provided to stiffening structures and directly connected to the support structure.

8 Claims, 2 Drawing Sheets

MOTOR VEHICLE, IN PARTICULAR A PASSENGER CAR

CROSS-REFERENCE TO RELATED APPLICATION

This application claims priority to German Patent Application No. 10 2011 115 594.9, filed Oct. 11, 2011, which is incorporated herein by reference in its entirety.

TECHNICAL FIELD

The technical field relates to a motor vehicle, in particular a passenger car, with a body in which at least one opening, such as a door opening, a trunk opening or the like is provided, which can be closed off by a pivotably articulated covering element, such as a door, a tail gate, a trunk lid or the like, which comprises an outer skin and a support structure and at least one function element arranged in between, which is connected to the outer skin.

BACKGROUND

Motor vehicles, in particular passenger cars with a function element arranged between an outer skin of a covering element and a support structure of said covering element are known from the prior art. Thus, the German disclosure publication DE 103 01 794 A1 describes a passenger car with a vehicle flap, such as an engine hood or a trunk flap which comprises a sheet metal outer skin and a support structure arranged spaced from said outer skin. Between the support structure and the sheet metal outer skin, a function carrier is arranged, which is connected to the sheet metal outer skin through a glued connection and which is tied to the support structure subject to the intermediate connection of a fixing element.

Accordingly, it is desirable to provide an improved passenger car in particular its engine hood or trunk flap serving as covering elements, using simple design measures.

SUMMARY

In various embodiments, a motor vehicle, in particular a passenger car with a body is proposed, in which at least one opening, such as a door opening, a trunk opening or the like is provided, which can be closed off by a pivotably articulated covering element, such as a door, a tail gate, a trunk lid or the like, which comprises an outer skin and a support structure and at least one function element arranged in between, which is connected to the outer skin, wherein the function element is provided with stiffening structures and directly connected to the support structure.

The support of an outer skin, for example of a door, an engine hood, a tail gate or a trunk lid against a support structure such as for example a rib structure produced from sheet metal, produces a dimensionally stiff embodiment, in particular on regions of the mentioned vehicle covering elements provided with function components such as door locks, door hinges or the like. Through the direct coupling of the function element to the support structure, the construction of the vehicle covering element is simplified compared to the prior art, with a simultaneously clearly improved stiffness in the region of the attachment position of the function element, since the latter is directly connected both to the outer skin and also to the support structure without intermediate connection of aids such as auxiliary supports, holding structures or the like.

In various embodiments, the function element is connected to the support structure in a non-positive or materially joined manner.

As non-positive and/or materially-joined connection, gluing or welding connections for example are suitable, wherein the latter are employed when the function element and the support structure are formed from sheet steel.

A particularly simple and simultaneously support-stiff function element is provided, when according to various embodiments it is provided that the function element is at least approximately formed in the manner of a shell and the shell walls form a first stiffening structure and are divided in particular with additional stiffening measures.

The support characteristics of a shell-like function element, wherein the shell walls, in particular the shell walls extending from the support structure towards the outer skin, form a stiffening structure, can be optimized in a particularly simple manner through a dimensioning and configuration of these shell side walls matched to the respective force effect.

A particularly stiff function element for supporting the outer skin against the support structure is obtained when according to further embodiments it is provided that the shell is provided with beads at least on its shell bottom, which serve as second stiffening structure and extend from the support structure towards the outer skin and preferentially run over the entire width of the shell bottom.

A particularly favorable force introduction between the function element and the support structure is obtained when according to further embodiments it is provided that the function element, with at least one of its shell walls, preferentially with at least two of its shell walls, in particular subject to the inclusion of the shell bottom, areally supports itself against the support structure.

Through the areal contact, the function element can be additionally connected to the support structure in a particularly simple non-positive and/or materially joined manner. Through the simultaneous supporting of a shell side wall and its shell bottom, the function element can be positioned in a particularly accurate position on the support structure, in particular when the shell side wall is the shell side wall facing away from the outer skin. This side wall then not only supports itself areally on the support structure in force introduction direction towards the outer skin, but additionally forms an angled-off portion together with the shell bottom, which can be accurately joined in position together with a corresponding angled-off portion on the support structure.

It is provided that the function element has a rectangular outline and at least the wall arranged on a longer rectangle side serves as support wall areally supporting itself against the support structure.

Particularly, the side wall of the function element located opposite the support wall serves as connecting wall to the outer skin. This produces particularly varied tying possibilities of the outer skin to the function element.

A particularly support-stiff function element is obtained, when according to various embodiments it is provided that between the support wall and the connecting wall the beads extend on the shell bottom.

According to further embodiments it is provided that the connecting wall, preferentially the entire length of the connecting wall, is connected to the outer skin through a glued connection, in particular through an adhesive bead.

By fastening the connecting element to the outer skin by means of a glued connection, the risk of markings on the outer skin impairing the aesthetic appearance of the outer skin is clearly reduced, in particular when the glued connection is brought about by an adhesive bead. In particular, such markings are safely avoided particularly when for producing the adhesive bead, adhesives are used, during the curing of which the geometry of the liquid adhesive bead is at least largely retained.

Particularly, the connecting wall is connected to the outer skin on its inside.

By connecting the inside of the connecting wall to the outer skin, a particularly favorable possibility of applying the adhesive onto the connecting wall is obtained, in particular when the latter encloses an obtuse intermediate angle between itself and the shell bottom.

Particularly, the inside of the connecting wall and the shell bottom enclose an obtuse intermediate angle which is between 90° and 270° but between 180° and 270°.

The function element can be simply produced in different variations when according to various embodiments it is provided that the function element is embodied of metal, in particular as a deep-drawn part shaped from sheet steel.

A function element produced in this manner can be particularly easily adapted to geometry and support requirements in particular with respect to its tying to the support structure or to the outer skin.

It is also possible in exactly the same way to form the function element from so-called organo-sheets, in particular from a multi-layer construction of these metal sheets.

According to various embodiments it is provided that the function element at least on its support wall and on its shell bottom is provided with break-throughs.

With the help of the break-throughs, the shell interior space of the shell-like function element is still accessible from different sides even in the installation state of the function element and the interior space thus also utilizable for the assembly of different function components. In addition, the break-throughs make possible the leading-through of lines, such as electrical connection lines or the like in a room and space-saving manner over and beyond the function element. In addition, electrical components which are installed in the region of the function element are also accessible with the help of the break-throughs for their contacting to electrical connecting lines.

Particularly, the function element is arranged on a tail gate serving as covering element at least in the near region of its lock.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses. Furthermore, there is no intention to be bound by any theory presented in the preceding background or the following detailed description.

Figure 1:
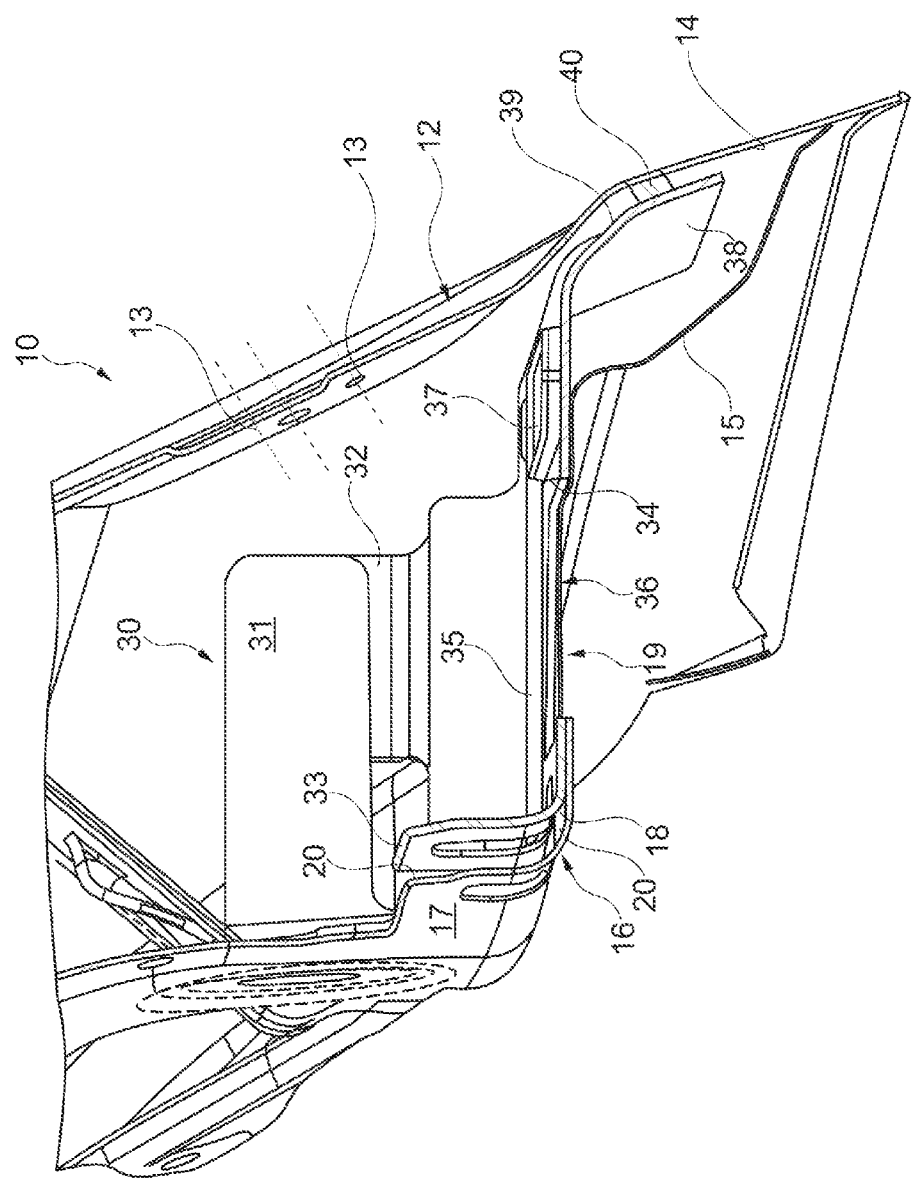
FIG. 1 is a detail of the tail gate of a passenger car with a function element arranged between its outer skin and its support structure in a three-dimensional sectional representation from the side.

According to FIG. 1, a tail gate 10 for closing a trunk opening which is not shown in more detail belonging to a passenger car is shown in simplified schematic representation. The tail gate 10 comprises an outer skin which is painted in the decorative final state, which outer skin in its lower region is provided with a depression 12, in which through-bores 13 for fastening a tail gate locking cylinder which is not shown are introduced. Spaced below the depression 12, the outer skin 11 on its back 14 is connected to a support structure 15, which in the present case is embodied as punched-bent sheet steel part and with its free lower end, is connected to the back 14 of the outer skin 11 in a non-positive and/or materially joined manner for example through gluing or welding. The support structure 15 has a shoulder 16 formed step-like at the height of the depression 12, which is formed by a shoulder leg 17 substantially running vertically and a shoulder leg 18 at least substantially angled off at a right angle thereto. The shoulder leg 18 is directed against the depression 12 and in the present case has an opening 19.

With their inside facing the depression 12, the shoulder legs 17 and 18 serves as contact surfaces 20 for a function element 30 that is formed in the manner of a shell in the present case.

Figure 2:
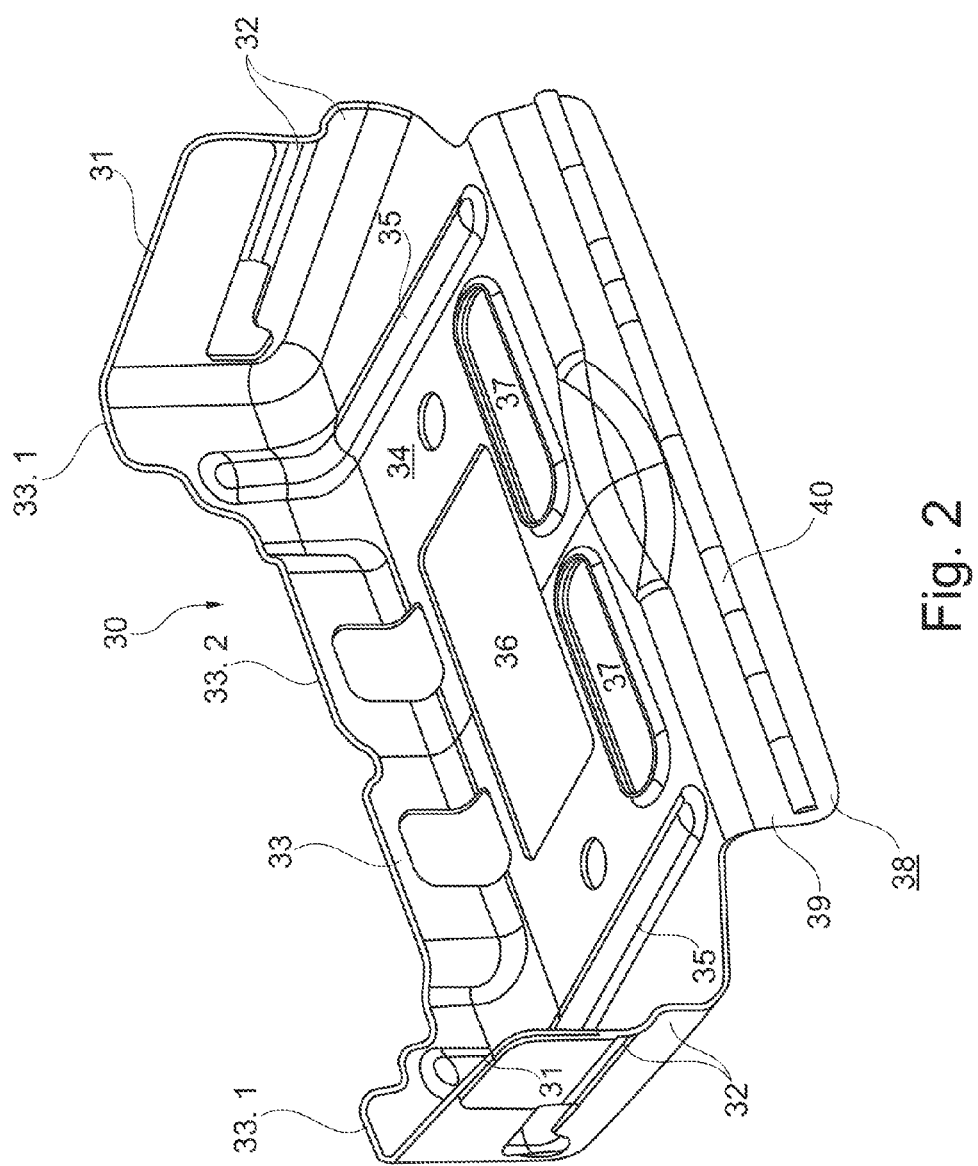
FIG. 2 is the function element in three-dimensional view from the top.

As is evident in particular from FIG. 2, the shell-like function element 30 in the present case is embodied as deep-drawn part and has a rectangular shaped outline. The function element 30 comprises shell side walls 31 running towards the back of the outer skin 11, which are provided with stiffening bulges 32 and form a first stiffening structure for the function element 30 (see also FIG. 1 in this regard). The shell side walls 31 are connected to a shell wall serving as shell back wall 33 on its back facing away from the back of the outer skin 11, which is connected to the shoulder leg 17 through welding. The shell back wall 33 in the present case is provided with a recess 33.2 in its middle region for forming defined contact surfaces 33.1, as a result of which the contact surfaces 33.1 are formed laterally. The shell side walls 31 in the present case are uni-materially connected to a shell bottom 34, which is equipped with beads 35 in the near region to the shell side walls 31, which serve as second stiffening structure and, starting out from the shell back walls 33, extend over the entire depth of the shell bottom 34. Between the beads 35 serving as second stiffening structure, the shell bottom 34 is equipped with break-throughs 36 and 37, of which the break-through 36 has a rectangular outline and with one of its longer rectangle sides runs adjacently to the shell back wall 33. The break-through 36 is introduced into the shell bottom 34 in such a manner that its longer rectangle sides are approximately arranged in the middle with respect to the length of the shell bottom 34. The break-throughs 37 are arranged in front of the break-through 36 towards the free front end of the shell bottom 34. In the present case, these are formed as passages and have an oval-like outline, the longer oval side of which extends alongside the longer rectangle side of the shell bottom 34.

With its lower side, the shell bottom 34 rests on the upper side of the support leg 18 and is connected to the latter for example through welding.

On the shell bottom 34, on its longer rectangle side facing away from the shell rear wall 33 a shell front wall 38 is uni-materially connected, which in the present case is angled-off in such a manner that its free end is directed away from the shell back wall 33 and an obtuse intermediate angle is formed between its inside 39 and the top of the shell bottom 34. The inside 39 serves as carrier surface of an adhesive 40 which in the present case is applied in the manner of a bead, which substantially extends alongside the shell front wall 38 over almost the entire length of the inside 39 and is arranged in the front third of the inside 39.

As is shown in particular in FIG. 1, the bead-like adhesive 40 on the inside 39 serves for the non-positive connection of the function element 30 by means of the shell front wall 38 serving as connecting wall to the back 14 of the outer skin 11. The location of the glued connection between the shell front wall 38 of the function element 30 serving as connecting wall and the back 14 of the outer skin 11 is selected in the present case in such a manner that the tying of the outer skin 11 to the function element 30 is affected directly below the depression 12.

Through the shell-like construction of the function element 30 combined with the employed stiffening structures 31 and 34 the outer skin 11 is connected to the support structure 15 in particular in the region of the attachment location for the lock of the tail gate via the function element 30 in a manner that is stiff regarding the shape and the support so that the composite withstands the closing forces that occur without damaging influences on the outer skin 11.

Contrary to the shown and described exemplary embodiment it is also possible to form and mold the shell front wall serving as connecting wall between the function element 30 and the back of the outer skin 11 in such a manner that it can be glued to the back 14 of the outer skin 11 in the region of the lock fastening.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle, comprising:
    a body comprising a pivotably articulated covering element, the pivotably articulated covering element comprising:
        an outer skin;
        a support structure supporting the outer skin; and
        a lock arranged in between the outer skin and the support structure, wherein the lock is directly connected to the support structure and the lock comprises a stiffening structure,
    wherein the stiffening structure comprises:
        a shell bottom;
        a shell back wall arranged on a longer rectangle side of the stiffening structure supporting the stiffening structure against the support structure and projecting in a first perpendicular direction from the shell bottom; and
        a shell front wall located opposite the support wall and projecting in a second perpendicular direction from the shell bottom and connecting the shell front wall to the outer skin, wherein the shell front wall is connected to the outer skin with a glued connection through an adhesive bead.

2. The motor vehicle according to claim 1, wherein the lock is connected to the support structure in a materially joined manner.

3. The motor vehicle according to claim 1, wherein the shell bottom comprises beads forming a stiffening structure.

4. The motor vehicle according to claim 1, wherein adhesive beads extend on the shell bottom.

5. The motor vehicle according to claim 1, wherein an inside of the shell front wall is connected to the outer skin.

6. The motor vehicle according to claim 5, wherein the inside of the shell front wall and the shell bottom enclose an obtuse intermediate angle.

7. The motor vehicle according to claim 1, wherein the stiffening structure is formed of metal as shaped deep-drawn sheet steel part.

8. The motor vehicle according to claim 1, wherein the stiffening structure at least on its shell back wall and on its shell bottom is provided with break-throughs.

* * * * *